United States Patent
Sasaki et al.

(10) Patent No.: US 10,361,431 B2
(45) Date of Patent: Jul. 23, 2019

(54) LITHIUM ION SECONDARY BATTERY

(71) Applicants: Hideaki Sasaki, Tokyo (JP); Takehiro Noguchi, Tokyo (JP)

(72) Inventors: Hideaki Sasaki, Tokyo (JP); Takehiro Noguchi, Tokyo (JP)

(73) Assignee: NEC Corporation, Tokyo (JP)

(*) Notice: Subject to any disclaimer, the term of this patent is extended or adjusted under 35 U.S.C. 154(b) by 739 days.

(21) Appl. No.: 14/389,430

(22) PCT Filed: Mar. 26, 2013

(86) PCT No.: PCT/JP2013/058745
§ 371 (c)(1),
(2) Date: Sep. 30, 2014

(87) PCT Pub. No.: WO2013/146766
PCT Pub. Date: Oct. 3, 2013

(65) Prior Publication Data
US 2015/0064554 A1    Mar. 5, 2015

(30) Foreign Application Priority Data
Mar. 30, 2012    (JP) ................................ 2012-082796

(51) Int. Cl.
*H01M 4/50* (2010.01)
*H01M 4/04* (2006.01)
(Continued)

(52) U.S. Cl.
CPC ......... *H01M 4/502* (2013.01); *H01M 4/0404* (2013.01); *H01M 4/1391* (2013.01);
(Continued)

(58) Field of Classification Search
CPC .. H01M 4/0404; H01M 4/1391; H01M 4/505; H01M 4/583; H01M 4/587;
(Continued)

(56) References Cited

U.S. PATENT DOCUMENTS

2003/0108790 A1*  6/2003  Manthiram ........... H01M 4/131
                                                    429/218.1
2006/0182678 A1*  8/2006  Shinoda .................. H01M 4/86
                                                    423/414
(Continued)

FOREIGN PATENT DOCUMENTS

JP    2002-298835    10/2002
JP    2003-007303     1/2003
(Continued)

OTHER PUBLICATIONS

Oba et al., JP 2003007303 (English machine translation) "Nonaqueous electrolyte secondary battery", Oct. 1, 2003.*
(Continued)

*Primary Examiner* — Sarah A. Slifka
*Assistant Examiner* — Brian R Ohara
(74) *Attorney, Agent, or Firm* — Finnegan, Henderson, Farabow, Garrett & Dunner, L.L.P.

(57) ABSTRACT

The present invention relates to a positive electrode for lithium ion secondary batteries, the positive electrode comprising a positive electrode active material and a positive electrode binder, in which the positive electrode active material comprises lithium manganate having a spinel structure, and the positive electrode binder comprises at least polyvinylidene fluoride (PVDF) and a resin having sulfone linkages, and to a lithium ion secondary battery comprising the positive electrode for lithium ion secondary batteries.

9 Claims, 1 Drawing Sheet

(51) Int. Cl.
| | |
|---|---|
| *H01M 4/1391* | (2010.01) |
| *H01M 4/505* | (2010.01) |
| *H01M 4/583* | (2010.01) |
| *H01M 4/587* | (2010.01) |
| *H01M 4/62* | (2006.01) |
| *H01M 10/04* | (2006.01) |
| *H01M 10/0525* | (2010.01) |

(52) U.S. Cl.
CPC ........... *H01M 4/505* (2013.01); *H01M 4/583* (2013.01); *H01M 4/587* (2013.01); *H01M 4/622* (2013.01); *H01M 4/623* (2013.01); *H01M 10/04* (2013.01); *H01M 10/0525* (2013.01); *Y10T 29/4911* (2015.01)

(58) Field of Classification Search
CPC ...... H01M 4/623; H01M 4/622; H01M 10/04; H01M 10/0525
See application file for complete search history.

(56) References Cited

U.S. PATENT DOCUMENTS

| | | | | |
|---|---|---|---|---|
| 2007/0111102 A1* | 5/2007 | Inoue | ................... | H01M 4/362 429/232 |
| 2008/0160406 A1 | 7/2008 | Kato et al. | | |
| 2010/0252426 A1* | 10/2010 | Tsukuda | ................ | H01M 2/162 427/340 |
| 2012/0064398 A1 | 3/2012 | Kim et al. | | |
| 2012/0082883 A1* | 4/2012 | Yamaguchi | ........... | H01M 4/131 429/144 |

FOREIGN PATENT DOCUMENTS

| | | | | |
|---|---|---|---|---|
| JP | 2005-222780 | | 8/2005 | |
| JP | 2007-188864 | | 7/2007 | |
| JP | 2008-010307 | | 1/2008 | |
| JP | 2010-277756 | | 12/2010 | |
| JP | 2010277756 A | * | 12/2010 | ............ H01M 4/131 |
| JP | 2012-059690 | | 3/2012 | |
| WO | WO 2010/137730 A1 | | 12/2010 | |

OTHER PUBLICATIONS

Oba et Oba et al., JP 2003007303 (English machine translation) "Nonaqueous electrolyte secondary battery", Oct. 1, 2003.*
Nakijima et al., JP 2005222780 (English machine translation) "Lithium-ion secondary battery", Aug. 18, 2005.*
Merriam-Webster Definition spinel (Year: 2017).*
International Search Report dated Jun. 18, 2013 in corresponding PCT International application.

* cited by examiner

LITHIUM ION SECONDARY BATTERY

CROSS-REFERENCE TO RELATED PATENT APPLICATIONS

This application is a National Stage Entry of International Application No. PCT/JP2013/058745, filed Mar. 26, 2013, which claims priority from Japanese Patent Application No. 2012-082796, filed Mar. 30, 2012. The entire contents of the above-referenced applications are expressly incorporated herein by reference.

TECHNICAL FIELD

The present invention relates to a lithium ion secondary battery.

BACKGROUND ART

A lithium ion secondary battery is small in volume, has a large mass capacity density, can take out a high voltage, and therefore is widely adopted as a power source for small devices. The lithium ion secondary battery is used as, for example, a power source for mobile devices such as a cellular phone and a notebook-sized personal computer. Moreover, in recent years, application of the lithium ion secondary battery not only to small mobile devices but also to large secondary batteries in the field of electric vehicles (EV), electric power storage, or the like where a large capacity with long life is required has been expected, based on concern for environmental issues and improvement in consciousness of energy conservation.

A positive electrode for lithium ion secondary batteries is constituted from a positive electrode mixture containing: a positive electrode active material such as a lithium composite oxide; a conducting agent such as carbon; and a binder such as a polyvinylidene fluoride (PVDF) and a collector that is joined with the positive electrode mixture.

Examples of the lithium composite oxide that is used for the positive electrode active material include $LiCoO_2$, $LiNiO_2$, $LiMnO_2$, and $LiNi_{1/3}Co_{1/3}Mn_{1/3}O_2$ each having a layered structure and $LiMn_2O_4$ having a spinel structure. Among these lithium composite oxides, $LiMn_2O_4$ is highly safe and inexpensive and therefore is considered especially suitable as a positive electrode material for large batteries. However, it has sometimes occurred that Mn elutes when $LiMn_2O_4$ is exposed to an elevated temperature environment and thereby the deterioration of battery capacity is liable to occur during charge-discharge cycles or storage at elevated temperatures. A method for suppressing the elution of Mn by adding any of various elements to the positive electrode active material to stabilize the crystal structure, or the like has been tried, but it is still hard to say that the problem has fully been solved, and it has remained to be solved when $LiMn_2O_4$ is used.

On the other hand, in addition to the improvement in the active material itself, investigation for enhancement of the battery performance such as cycle properties or safety properties has been tried by adding an additive to the electrode or using a binder having a particular structure. The binder plays a role of adhesion between the active materials and between the active material and a collector. For the binder for a positive electrode, the electrochemical stability (oxidation resistance), the resistance to an electrolyte solution, the heat resistance, the slurry properties (imparting viscosity), low cost, and so on are required, and PVDF that is excellent in terms of balance has generally been used.

Moreover, for example, adding a sulfur-containing resin such as polyethersulfone (PES) and polysulfone (PS) to the electrode and using PES or PS as an electrode binder have been known. A method of adding polymer particles of a sulfur-containing resin to the electrode is disclosed in Patent Literature 1, and a method of adding polysulfone, polyethersulfone, or the like to the electrode as an overcharge preventing agent of a lithium nickel manganese positive electrode having a layered structure is disclosed in Patent Literature 2. Moreover, in Patent Literatures 3 and 4, a method of using a sulfur-containing resin for a negative electrode binder is disclosed.

CITATION LIST

Patent Literature

Patent Literature 1: Japanese Patent Laid-Open No. 2003-007303
Patent Literature 2: Japanese Patent Laid-Open No. 2010-277756
Patent Literature 3: Japanese Patent Laid-Open No. 2002-298835
Patent Literature 4: Japanese Patent Laid-Open No. 2008-10307

SUMMARY OF INVENTION

Technical Problem

However, although the positive electrodes described in the prior art documents partially exhibit properties equal to or better than the properties of PVDF, they are still inferior to PVDF in terms of the total battery performance such as battery properties, production cost, and production process, and thus they have not been put into practical use yet.

Moreover, in the lithium manganate, Mn is liable to elute into the electrolyte solution particularly at elevated temperatures of 40° C. or more, and it sometimes occurs that the eluted Mn is deposited on the negative electrode to bring about an increase in the internal resistance or lowering of the battery capacity. Although an attempt to improve the elution of Mn from the positive electrode active material by a substituent element or the like has been made, the problem has not yet been perfectly solved. Moreover, a method for suppressing the influence of deposited Mn by adding an additive that forms an SEI (Solid Electrolyte Interface) film on the negative electrode to the electrolyte solution has been considered. However, none of the methods have been sufficiently effective.

The present invention intends to enhance the cycle properties at elevated temperatures of a lithium ion secondary battery using lithium manganate having a spinel structure and to provide a positive electrode for a secondary battery capable of providing a secondary battery having a high capacity retention ratio in charge-discharge cycles at elevated temperatures.

Solution to Problem

The positive electrode for a secondary battery of the present invention contains a positive electrode active material and a positive electrode binder, in which the positive electrode active material contains lithium manganate having a spinel structure and the positive electrode binder contains at least polyvinylidene fluoride (PVDF) and a resin having sulfone linkages.

Advantageous Effect of Invention

According to the present invention, a secondary battery having a high capacity retention ratio in charge-discharge cycles at elevated temperatures can be provided.

DESCRIPTION OF EMBODIMENTS

[Positive Electrode]

Figure 1:
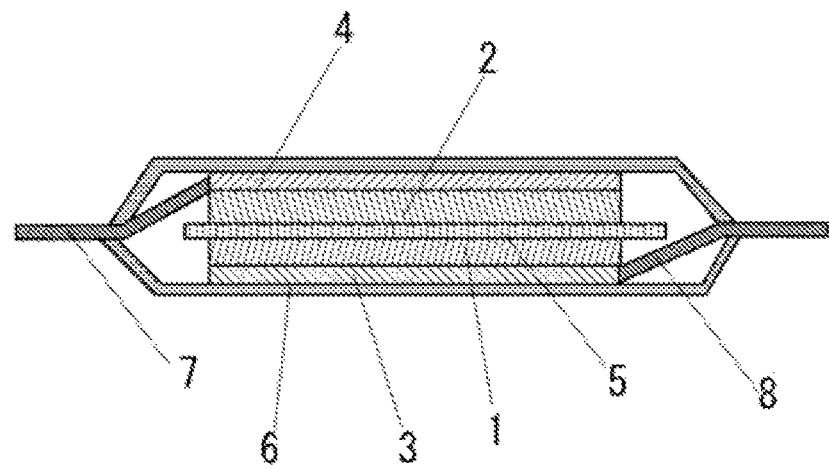
FIG. 1 is a cross sectional view illustrating an example of a secondary battery according to the present embodiment.

The positive electrode for a secondary battery according to the present embodiment contains, as an active material, lithium manganate having a spinel structure and further contains, as a binder, PVDF and a resin having sulfone linkages.

(Positive Electrode Active Material)

In the present embodiment, it is preferable that the positive electrode active material contains lithium manganate having a spinel structure. Lithium manganate having a spinel structure is represented by the following formula (1):

$$\text{LiMn}_{2-x}\text{M}_x\text{O}_4 \qquad (1)$$

(wherein, M represents at least one element selected from the group consisting of Mg, Al, Co, Ni, Fe, and B, and $0 \leq x < 2$), and, for example, the lithium manganate having a spinel structure may be a non-stoichiometric composition such as a Li excess composition. One of the compounds represented by the formula (1) may be used alone, or two or more kinds may be used in combination. Although lithium manganate has lower capacity than lithium cobaltate and lithium nickelate, lithium manganate is lower than Ni and Co in terms of the material cost because the output of production of Mn is larger that of Ni and Co and has high heat stability because lithium manganate has a spinel structure. Therefore, lithium manganate is preferable as a positive electrode active material for a large secondary battery for electric vehicles, electric power storage, and so on. In the present embodiment, it is preferable that lithium manganate having a spinel structure is contained by an amount of 50 mass % or more in the positive electrode active material.

Moreover, in the present embodiment, a positive electrode active material having a layered structure such as lithium cobaltate ($LiCoO_2$) and lithium nickelate ($LiNiO_2$) may further be contained as a positive electrode active material.

It is preferable that lithium manganate that is used in the present embodiment and that has a spinel structure has an average particle diameter (D50) of 1 µm or more and 30 µm or less, more preferably 5 µm or more and 20 µm or less. Moreover, lithium manganate having a spinel structure has a specific surface area of preferably 0.1 to 1 m²/g, more preferably 0.2 to 0.5 m²/g. In addition, the average particle diameter (D50) means a value measured by a laser diffraction/scattering method. Moreover, the specific surface area means a value measured and calculated by a BET method.

(Binder for Positive Electrode)

In the present embodiment, at least PVDF and a resin having sulfone linkages are used in combination as a binder for a positive electrode.

The present inventors have taken notice of the fact that the binder covers the surface of the active material, and have diligently examined whether the reaction of the positive electrode active material with the electrolyte solution and the elution of Mn can directly be suppressed or not by covering the surface of lithium manganate having a spinel structure with such a polymer that exhibits a function similar to that of the SEI film. As a result thereof, the present inventors have found out that it is significantly effective for the purpose of enhancing cycle properties at elevated temperatures to use PVDF and a resin having sulfone linkages such as polyethersulfone (PES) together. In addition, it is not disclosed or suggested at all in the above-described Patent Literatures 1 to 4 that using a combination of PVDF and the resin having sulfone linkages as positive electrode binders in the positive electrode comprising lithium manganate exhibits a particularly excellent effect. Furthermore, the present inventors have also found preferable formulation of the electrode and preferable terminal structure of PES. Hereinafter, the description will be made in detail.

In the present embodiment, the resin having sulfone linkages may contain benzene rings and/or ether linkages in addition to the sulfone linkages, and it is preferable that the resin having sulfone linkages has at least the following structure.

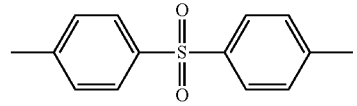

Specific examples of a repeating unit that constitutes the resin having sulfone linkages are listed below. In addition, in the following examples a to w, abbreviations mean as follows. Ph; a phenyl group or a phenylene group, —$SO_2$—; a sulfonyl group, —O—; an oxy group, —S—; a thio group, —CO—; a carbonyl group, and $CH_3$—; a methyl group. n: an integer from 100 to 10,000.

a: (-Ph-$SO_2$—)$_n$,
b: (-Ph-$SO_2$-Ph-)$_n$,
c: (-Ph-$SO_2$-Ph-Ph-$SO_2$-Ph-)$_n$,
d: (-Ph-$SO_2$-Ph-Ph-Ph-$SO_2$-Ph-)$_n$,
e: (-Ph-$SO_2$-Ph-Ph-Ph-$SO_2$—)$_n$,
f: (-Ph-$SO_2$-Ph-O—)$_n$,
g: (-Ph-$SO_2$-Ph-$SO_2$-Ph-O—)$_n$,
h: (-Ph-$SO_2$-Ph-$SO_2$-Ph-O-Ph-O—)$_n$,
i: (-Ph-$SO_2$-Ph-Ph-$SO_2$-Ph-O—)$_n$,
j: (-Ph-$SO_2$-Ph-Ph-$SO_2$-Ph-O-Ph-O—)$_n$,
k: (-Ph-$SO_2$-Ph-Ph-$SO_2$-Ph-O-Ph-Ph-O—)$_n$,
l: (-Ph-$SO_2$-Ph-Ph-O-Ph-O—)$_n$,
m: (-Ph-$SO_2$-Ph-O-Ph-O-Ph-O—)$_n$,
n: (-Ph-$SO_2$-Ph-O-Ph-Ph-O—)$_n$,
o: (-Ph-$SO_2$-Ph-$CH_2$-Ph-$SO_2$-Ph-O—)$_n$,
p: [-Ph-$SO_2$-Ph-Ph-O-Ph-C($CH_3$)($CH_3$)-Ph-O—]$_n$,
q: [-Ph-$SO_2$-Ph-O-Ph-C(Ph)(Ph)-Ph-O—]$_n$,
r: (-Ph-$SO_2$-Ph-S—)$_n$,
s: (-Ph-$SO_2$-Ph-O-Ph-CO-Ph-O—)$_n$,
t: (-Ph-$SO_2$-Ph-O-Ph-O—)$_n$,
u: [-Ph-$SO_2$-Ph-O-Ph-C($CH_3$)($CH_3$)-Ph-O—]$_n$,
v: (-Ph-Ph-$SO_2$-Ph-Ph-$SO_2$-Ph-O—)$_n$,
w: [—($CH_3$)($CH_3$)-Ph-$SO_2$-Ph($CH_3$)($CH_3$)—O-Ph-CO-Ph-O—]$_n$.

In the present invention, polysulfone, polyethersulfone (PES), or polyphenylsulfone is suitably used as a resin containing sulfone linkages. These resins may be used alone or in combination of two or more kinds. Among these resins, it is preferable in the present embodiments to use PES having a repeating unit represented by the above-described f.

Hereinafter, the description will be made using the example in which PES is used as a resin having sulfone linkages, however the resin in the present embodiment may be used as long as the resin has sulfone linkages and is not limited to PES.

The reason why PES is preferable as a positive electrode binder in the case where the positive electrode active material contains lithium manganate is not entirely clear, but it is presumed as follows.

PVDF has no functional groups that interact with the active material or lithium ions, and therefore PVDF does not have any direct influence on the battery reaction. On the other hand, PES contains s sulfone bond (—S(=O)$_2$—) as a functional group. The sulfone linkage is contained characteristically in sulfone based compounds such as propane sultone known as an additive that forms the SEI film on the negative electrode. Thus, it is presumed that PES covers the surface of the positive electrode active material, thereby the action similar to that of the SEI film is exhibited to suppress the decomposition reaction with the electrolyte solution and the elution of Mn and the cycle properties at elevated temperatures are improved. Therefore, it is expected that any resin having sulfone linkages exhibits an effect similar to the effect of PES.

PES contains ether linkages (—O—) and benzene rings in addition to the sulfone linkages. The ether group is also contained in vinyl compounds such as vinylene carbonate (VC) known as an additive that forms the SEI film on the negative electrode. Moreover, the benzene ring might be partially decomposed via ring-opening on the interface of the positive electrode with a high electric potential, and bonded chemically to the surface of the positive electrode active material to form a strong film. Thus, it is presumed that PES exhibits particularly excellent effect among the resins having sulfone linkages.

Moreover, it is preferable in the present embodiment that PES has, at a terminal thereof, a substituent capable of enhancing affinity with the positive electrode active material, it is more preferable that PES has a hydroxyl group, a carboxyl group, or the like at a terminal thereof, and it is further more preferable that PES has a hydroxyl group at a terminal thereof. The adhesiveness between the positive electrode collector and PES can be enhanced by PES having a terminal hydroxyl group. Moreover, since the affinity with the positive electrode active material is further enhanced by PES having a terminal hydroxyl group, a more uniform and denser coating layer can be formed on the surface of the positive electrode active material. It is preferable that the content of the terminal hydroxyl group in PES is 0.6 or more per 100 polymerized repeating units because the above-described effect can sufficiently be obtained. The upper limit is not particularly limited because the upper limit also depends on the molecular weight of the polymer, however it is preferable that the upper limit is, for example, 2 or less from the viewpoint of easiness of production, production cost, or the like.

As PES, Sumika Excel (product name, manufactured by Sumitomo Chemical Co., Ltd.), Ultrazone (product name, manufactured by BASF Japan Ltd.), Veradel (product name, manufactured by Solvay Advanced Polymers LLC.), and so on are sold on the market. Moreover, examples of PES containing a hydroxyl group at a terminal thereof include Sumika Excel 5003 PS (product name, manufactured by Sumitomo Chemical Co., Ltd).

It is preferable in the present embodiment that PES is used together with PVDF. In the case where PES and PVDF are used together, the PES concentration in the binder (PES/(PVDF+PES)×100 mass %) is not particularly limited, but it is preferable that the PES concentration is 10 mass % to 60 mass %. When the concentration of PES is too high, the deterioration of the electrode caused by the decomposition of PES may occur because PES has a lower oxidation resistance than fluororesins such as PVDF. Moreover, PES forms a coating layer similar to the SEI film on the surface of the active material, however when only PES is used, the coating layer becomes too thick and the interface resistance of the positive electrode, namely the internal resistance of the battery, is increased to have an adverse effect on the battery properties. Furthermore, when only PES is used, it sometimes occurs that the adhesive strength of the electrode is low. On the other hand, when the PES concentration is too low, the above-described effect obtained by adding PES becomes small.

Since the surface of the oxides such as lithium manganate has a high polarity, it is anticipated that PES having sulfone linkages has a stronger affinity with lithium manganate than PVDF. That is, since a polymer layer having a high PES concentration is spontaneously formed on the surface of lithium manganate, it is considered that the coating effect is exhibited even at a relatively low concentration of PES as 10 mass % in the binder.

In the present embodiment, another positive electrode binder may be contained within a range which does not impair the object of the present invention. Examples of another positive electrode binder include P(VDF-TFE) copolymers, copolymers of polyvinyl chloride and polyvinylidene chloride, acrylic resins, polyvinyl butyral, and polyvinyl acetal.

(Method for Producing Positive Electrode)

The positive electrode according to the present embodiment can be produced by preparing a positive electrode slurry obtained by dispersing and kneading a positive electrode active material containing lithium manganate, a positive electrode binder containing PVDF and PES, and a conductive assistant or the like as necessary in a solvent such as NMP, and applying the positive electrode slurry to the positive electrode collector and drying the resultant. The content of each compound contained in the positive electrode slurry is not particularly limited, but it is preferable that, for example, the positive electrode active material is contained in a range from 85 to 96 mass %, the binder is contained in a range from 2 to 8 mass %, and the conductive assistant is contained in a range from 2 to 8 mass % relative to the total mass of the solid content in the positive electrode slurry.

It is preferable that PES and PVDF are uniformly dissolved in the positive electrode slurry because PES can uniformly cover the surface of the positive electrode active material. On the other hand, it is considered that, in Patent Literature 1, for example, PES is dispersed in the form of particles in the electrode, and it is difficult to obtain the effect of the present invention therefrom. In preparation of the positive electrode slurry, it is preferable that PVDF and PES are dissolved in advance in a solvent to make a binder solution, and thereafter the binder solution is mixed with the positive electrode active material and the conductive assistant.

Examples of the conductive assistant that is used for the positive electrode include high crystalline carbon, carbon black, and carbon fiber. These conductive assistants may be used alone or in combination of two or more kinds.

As the positive electrode collector, aluminum, stainless steel, nickel, and titanium, or alloys thereof can be used.

The electrode density of the obtained positive electrode can be adjusted by compressing the positive electrode active material layer by a roll press method or the like.

[Secondary Battery]

The secondary battery in the present embodiment is not particularly limited as long as the secondary battery comprises the positive electrode according to the present embodiment. A laminate type secondary battery is illustrated in FIG. 1 as an example of the secondary battery according to the present embodiment. In the secondary battery illustrated in FIG. 1, a separator 5 is sandwiched between the positive electrode comprising a positive electrode active material layer 1 containing the positive electrode active material and the positive electrode binder each according to the present embodiment and a positive electrode collector 3 and the negative electrode comprising a negative electrode active material layer 2 containing the negative electrode active material that can intercalate and deintercalate lithium and a negative electrode collector 4. The positive electrode collector 3 is connected to a positive electrode tab 8, and the negative electrode collector 4 is connected to a negative electrode tab 7. A laminated outer package 6 is used as an outer package, and the inside of the secondary battery is filled with a nonaqueous electrolyte solution.

[Negative Electrode]

The negative electrode of the secondary battery according to the present embodiment is not particularly limited but is obtained by, for example, forming a negative electrode active material layer on at least one face of the negative electrode collector such as silver foil. The negative electrode active material layer contains at least a negative electrode active material, a negative electrode binder, and a conductive assistant as necessary.

(Negative Electrode Active Material)

The negative electrode active material contained in the negative electrode of the secondary battery according to the present embodiment is not particularly limited, and a carbon material such as graphite and amorphous carbon can be used, but it is preferable to use graphite from the viewpoint of energy density. Moreover, as a negative electrode active material, materials that form an alloy with Li such as Si, Sn, and Al; Si oxides; Si composite oxides containing Si and another metal element other than Si; Sn oxides; Sn composite oxides containing Sn and another metal element other than Sn; and $Li_4Ti_5O_2$, or composite materials in which the above-described materials are coated with carbon; or the like can also be used. The negative electrode active materials can be used alone or in combination of two or more kinds. It is preferable that the negative electrode active material has an average particle diameter (D50) of 5 to 50 μm, more preferably 10 to 30 μm. It is preferable that the negative electrode active material has a specific surface area of 0.5 to 5 $m^2/g$, more preferably 0.5 to 2 $m^2/g$.

As a negative electrode binder, fluorine compounds such as polyvinylidene fluoride (PVDF) and rubber compounds such as styrene butadiene rubber (SBR) may be used. In the case where the rubber compound is used, a thickener such as carboxymethyl cellulose (CMC) or the sodium salt thereof may be used together. In the negative electrode of the present embodiment, it is preferable that the rubber compound and the thickener are used together, and it is more preferable that SBR and CMC are used together. The amount of the negative electrode binder relative to the total mass of the negative electrode active material, the negative electrode binder and the conductive assistant is not particularly limited, but is preferably 0.5 mass % or more and 15 mass % or less, more preferably 1 mass % or more and 8 mass % or less.

Examples of the conductive assistant that is used for the negative electrode include high crystalline carbon, carbon black, and carbon fiber. These conductive assistants may be used alone or in combination of two or more kinds.

The method for producing the negative electrode is not particularly limited, but first, for example, the negative electrode slurry is prepared by dispersing and kneading the negative electrode active material, the negative electrode binder and the conductive assistant as necessary in a prescribed blending amount in a solvent. Generally as a solvent of the negative electrode slurry, an organic solvent such as NMP is used in the case where the fluorine compound is used as a negative electrode binder, and water is used in the case where the rubber compound is used as a negative electrode binder. The negative electrode can be produced by applying the negative electrode slurry to the negative electrode collector and drying the resultant. The electrode density of the obtained negative electrode can be adjusted by compressing the negative electrode active material layer by a roll press method or the like.

(Nonaqueous Electrolyte Solution)

The nonaqueous electrolyte solution is not particularly limited, but, for example, a solution obtained by dissolving a lithium salt in a nonaqueous solvent can be used.

Examples of the lithium salt include $LiPF_6$, lithium imide salts, $LiAsF_6$, $LiAlCl_4$, $LiClO_4$, $LiBF_4$, and LiSbF6. Examples of the lithium imide salt include $LiN(C_kF_{2k+1}SO_2)(C_mF_{2m+1}SO_2)$ (k and m each independently represent 1 or 2). These lithium salts may be used alone or in combination of two or more.

As a nonaqueous solvent, at least one solvent selected from the group consisting of cyclic carbonates, chain carbonates, aliphatic carboxylic acid esters, γ-lactones, cyclic ethers, and chain ethers can be used. Examples of the cyclic carbonate include propylene carbonate (PC), ethylene carbonate (EC), butylene carbonate (BC), and derivatives thereof (including fluorinated compounds). Examples of the chain carbonate include dimethyl carbonate (DMC), diethyl carbonate (DEC), ethyl methyl carbonate (EMC), dipropyl carbonate (DPC), and derivatives thereof (including fluorinated compounds). Examples of the aliphatic carboxylic acid ester include methyl formate, methyl acetate, ethyl propionate, and derivatives thereof (including fluorinated compounds). Examples of the γ-lactone include γ-butyrolactone and derivatives thereof (including fluorinated compounds). Examples of the cyclic ether include tetrahydrofuran, 2-methyltetrahydrofuran, and derivatives thereof (including fluorinated compounds). Examples of the chain ethers include 1,2-diethoxy ethane (DEE), ethoxy methoxy ethane (EME), ethyl ether, diethyl ether, and derivatives thereof (including fluorinated compound). As a nonaqueous solvent other than the above-described nonaqueous solvents, dimethyl sulfoxide, 1,3-dioxolane, formamide, acetoamide, dimethylformamide, dioxolane, acetonitrile, propionitrile, nitromethane, ethyl monoglyme, phosphoric acid triester, trimethoxy methane, dioxolane derivatives, sulfolane, methyl sulfolane, 1,3-dimethyl-2-imidazolidinone, 3-methyl-2-oxazolidinone, 1,3-propane sultone, anisole, N-methylpyrrolidone, and derivatives thereof (including fluorinated compounds) may be used. These nonaqueous solvents may be used alone or in combination of two or more kinds.

It is preferable that the concentration of the lithium salt in the nonaqueous electrolyte solution is 0.7 mol/L or more and 1.5 mol/L or less. Sufficient ion conductivity can be obtained when the concentration of the lithium salt is 0.7 mol/L or more. Moreover, the viscosity can be reduced and the transfer of lithium ions is not inhibited when the concentration of the lithium salt is 1.5 mol/L or less.

Moreover, the nonaqueous electrolyte solution may contain an additive for the purpose of forming an SEI film of good quality on the surface of the negative electrode. The SEI film has a function of suppressing the reactivity with the electrolyte solution, making the desolvation reaction associated with the intercalation and deintercalation of the lithium ions smooth to prevent the deterioration of the structure of the negative electrode active material. Examples of the additive include propane sultone, vinylene carbonate, and cyclic disulfonic acid esters. These additives may be used alone, or in combination of two or more kinds.

It is preferable that the concentration of the additive in the nonaqueous electrolyte solution is 0.2 mass % or more and 5 mass % or less. Sufficient SEI film can be formed when the concentration of the additive is 0.2 mass % or more. Moreover, the resistance can be made low when the concentration of the additive is 5 mass % or less.

(Positive Electrode Tab and Negative Electrode Tab)

The positive electrode tab and the negative electrode tab are not particularly limited but, for example, at least one selected from the group consisting of Al, Cu, phosphor bronze, Ni, Ti, Fe, brass and stainless may be used as a material for the positive and negative electrode tabs.

(Separator)

The separator is not particularly limited, but porous films comprising a polyolefin such as polypropylene and polyethylene or fluororesin or the like can be used as a separator. Moreover, cellulose or an inorganic separator such as a glass separator can also be used.

(Outer Package)

The outer package is not particularly limited, but cans such as coin type, square type, and cylindrical type cans or laminated outer packages can be used as an outer package. Among these, a laminated outer package that is a flexible film comprising a laminated body of a synthetic resin and metal foil is preferable from the viewpoint that reduction in weight is possible and the energy density of secondary batteries is increased. The laminate type secondary battery comprising a laminated outer package is excellent in the heat dissipation property and therefore is suitable for a battery for cars such as an electric vehicle.

(Method for Producing Secondary Battery)

The method for producing the secondary battery according to the present embodiment is not particularly limited, but the Example of the methods is shown below. The positive electrode tab and the negative electrode tab are respectively connected through the positive electrode collector and the negative electrode collector to the positive electrode and the negative electrode for the secondary battery according to the present embodiment. The positive electrode and the negative electrode are placed so as to face each other for lamination with the separator sandwiched therebetween to prepare an electrode laminated body. The electrode laminated body is housed in the outer package and immersed in the electrolyte solution. The secondary battery is prepared by sealing the outer package so that a part of the positive electrode tab and a part of the negative electrode tab are protruded to the outside.

EXAMPLES

Hereinafter, examples of the present embodiment will be described in detail, but the present embodiment is not limited to the following examples.

Example 1

Preparation of Negative Electrode

Graphite powder (average particle diameter (D50): 22 μm, specific surface area: 1.0 m$^2$/g) as a negative electrode active material, styrene butadiene rubber (SBR) latex (average particle diameter 100 nm, solid content 50 mass %) as a binder, and a sodium salt of carboxymethyl cellulose (CMC) as a thickener were arranged. A 2 mass % CMC solution was prepared, mixed with the graphite powder so that the mass ratio of the solid content of the graphite powder to the solid content of CMC became 98.0:1.0, and the resultant mixture was sufficiently dispersed and kneaded while the viscosity of the slurry was adjusted by appropriately adding water. Next, the SBR was added so that the mass ratio of the solid content of the graphite powder, the solid content of the SBR, and the solid content of CMC became 98.0:1.0:1.0, and the resultant mixture was mixed well to prepare negative electrode slurry. The negative electrode slurry was applied on copper foil having a thickness of 15 μm, the copper foil being a negative electrode collector. Thereafter, a negative electrode active material layer was formed by conducting drying at 50° C. for 10 minutes and thereafter conducting drying again at 120° C. for 10 minutes. A negative electrode was prepared by pressing the negative electrode active material layer. In addition, the mass of the negative electrode active material layer per unit area after drying was set to 0.008 g/cm$^2$.

(Preparation of Positive Electrode)

LiMn$_2$O$_4$ powder (average particle diameter (D50): 15 μm, specific surface area: 0.5 m$^2$/g) as a positive electrode active material, PVDF as a binder, Sumika Excel 5003 PS (product name, manufactured by Sumitomo Chemical Co., Ltd.) as a PES containing 0.6 to 1.4 terminal hydroxyl groups per 100 polymerized repeating units, and carbon black as a conductive assistant were arranged. A PVDF solution having 8 mass % of PVDF dissolved in NMP and a PES solution having 20 mass % of the PES dissolved in NMP were prepared. The positive electrode active material, the PVDF solution, the PES solution, and the conductive assistant were dispersed and kneaded so that the mass ratio of the solid content of the positive electrode active material, PVDF, PES, and the conductive assistant became 93:3.6:0.4:3 to prepare positive electrode slurry while the viscosity was adjusted by appropriately adding NMP. The content of PES in the binder (PES/(PVDF+PES)×100 (mass %)) was 10 mass %. The positive electrode slurry was applied on aluminum foil having a thickness of 20 μm, the aluminum foil being a positive electrode collector. Thereafter, a positive electrode active material layer was formed by conducting drying at 125° C. for 10 minutes to evaporate NMP. A positive electrode was prepared by pressing the positive electrode active material layer. In addition, the mass of the positive electrode active material layer per unit area after drying was set to 0.024 g/cm$^2$.

(Nonaqueous Electrolyte Solution)

A nonaqueous electrolyte solution in which LiPF$_6$ as an electrolyte was dissolved in a nonaqueous solvent obtained by mixing EC and DEC in a ratio of EC:DEC=30:70 (volume %) so that the concentration of LiPF$_6$ became 1 mol/L was prepared. To the nonaqueous electrolyte solution, 1.5 mass % of vinylene carbonate as an additive was added.

(Preparation of Secondary Battery)

The prepared positive electrode and negative electrode were cut out to a size of 5 cm×6 cm, respectively. In each of the cut-out electrodes, a part with side lengths of 5 cm×1 cm was left as a part where an electrode active material layer was not formed (unapplied part) for the purpose of connecting a tab, and the size of the part where the electrode active material layer was formed was set to 5 cm×5 cm. A positive electrode tab of aluminum having a width of 5 mm×a length of 3 cm×a thickness of 0.1 mm was welded to the unapplied part of the positive electrode with a welding length of 1 cm by ultrasonic welding. Moreover, a negative electrode tab of nickel the size of which was the same as the size of the positive electrode tab was welded to the unapplied part of the negative electrode by ultrasonic welding. An electrode laminated body was obtained by placing the negative electrode and the positive electrode on both faces of a separator having a size of 6 cm×6 cm and comprising polyethylene and polypropylene so that the electrode active material layers were stacked across the separator. Three sides excluding one longer side of two aluminum laminate films each having a size of 7 cm×10 cm were adhered with an adhesion width of 5 mm by heat fusion to prepare a bag-shaped laminated outer package. The electrode laminated body was inserted into the bag-shaped laminated outer package so that the distance from one shorter side of the laminated outer package was 1 cm. Furthermore, 0.2 g of the nonaqueous electrolyte solution was subjected to liquid injection to perform vacuum impregnation, and thereafter the opening was sealed with a sealing width of 5 mm by heat fusion under reduced pressure. Thereby, a laminate type secondary battery was prepared.

(First Charge and Discharge)

First charge and discharge was applied to the prepared secondary battery. First of all, charging was conducted up to 4.2 V at a constant current of 10 mA corresponding to 5 hour rate (0.2 C) at 20° C., and thereafter charging at a constant voltage of 4.2 V was conducted for 8 hours in total. Thereafter, discharging was conducted at a constant current of 10 mA down to 3.0 V. The ratio of the first discharging capacity to the first charging capacity ((the first discharging capacity/the first charging capacity)×100%) was calculated as a charge and discharge efficiency (%).

(Rate Property)

Charging was applied up to 4.2 V at 1 C (50 mA) to the secondary battery after the first charge and discharge, and thereafter charging at a constant voltage of 4.2 V was conducted for 2.5 hours in total. Next, discharging at a constant current was conducted down to 3.0 V at 1 C, thereafter the battery was left standing for 5 minutes, and discharging was conducted again to 3.0 V at 0.2 C (10 mA). When the capacity during 1 C discharging was denoted as $D_1$ (mAh), and the capacity during 0.2 C discharging was denoted as $D_2$ (mAh), $D_1/(D_1+D_2)\times100(\%)$ was calculated as an index of the rate property.

(Cycle Test)

Charging was applied up to 4.2 V at 1 C (50 mA) to the secondary battery after the evaluation of the rate property, and thereafter charging at a constant voltage of 4.2 V was conducted for 2.5 hours in total. Thereafter, discharging at a constant current was conducted down to 3.0 V at 1 C. The charge and discharge cycle was repeated 300 times at 55° C. The ratio of the discharging capacity after 300 cycles ($C_{300}$) to the first cycle discharging capacity ($C_1$) ($C_{300}/C_1\times100\%$) was calculated as a capacity retention ratio (%).

Example 2

A secondary battery was prepared and evaluated in the same manner as in Example 1 except that the mass ratio of PVDF to PES was made so as to be PVDF:PES=8:2 (PES concentration was 20 mass %) in the preparation of positive electrode slurry.

Example 3

A secondary battery was prepared and evaluated in the same manner as in Example 1 except that the mass ratio of PVDF to PES was made so as to be PVDF:PES=2:1 (PES concentration was 33 mass %) in the preparation of positive electrode slurry.

Example 4

A secondary battery was prepared and evaluated in the same manner as in Example 1 except that the mass ratio of PVDF to PES was made so as to be PVDF:PES=1:1 (PES concentration was 50 mass %) in the preparation of positive electrode slurry.

Example 5

A secondary battery was prepared and evaluated in the same manner as in Example 1 except that the mass ratio of PVDF to PES was made so as to be PVDF:PES=2:3 (PES concentration was 60 mass %) in the preparation of positive electrode slurry.

Comparative Example 1

A secondary battery was prepared and evaluated in the same manner as in Example 1 except that only PVDF was used (PES concentration was 0 mass %) in the preparation of positive electrode slurry.

Comparative Example 2

A secondary battery was prepared and evaluated in the same manner as in Example 1 except that only PES was used (PES concentration was 100 mass %) in the preparation of positive electrode slurry.

Comparative Example 2

A secondary battery was prepared and evaluated in the same manner as in Example 1 except that only PES was used (PES concentration was 100 mass %) in the preparation of positive electrode slurry.

In Table 1, the evaluation results of Examples 1 to 5 and Comparative Examples 1 to 2 are shown in accordance with the order of the PES concentration in the binder. In Examples 1 to 5 where the PES concentrations were 10 to 60 mass %, the charge and discharge efficiencies and the rate properties were almost the same as the charge and discharge efficiency and the rate property of Comparative Example 1 where only PVDF was used, and the capacity retention ratios were improved. In Comparative Example 2 where only PES was used, a significant lowering of the capacity retention ratio was seen as well as the lowering of the initial rate property. It was found from the results that the cycle property at elevated temperatures of the secondary battery with lithium manganate could be improved by using PVDF and PES together as binders.

TABLE 1

| | PVDF concentration in positive electrode slurry (wt. %) | PES concentration in positive electrode slurry (wt. %) | PES concentration in positive electrode binder (mass %) | Charging and discharging efficiency (%) | Rate property (%) | Capacity retention ratio (%) |
|---|---|---|---|---|---|---|
| Com-Ex. 1 | 4 | 0.0 | 0 | 85.1 | 96.1 | 69.8 |
| Ex. 1 | 3.6 | 0.4 | 10 | 85.0 | 95.7 | 71.2 |
| Ex. 2 | 3.2 | 0.8 | 20 | 85.0 | 95.2 | 73.4 |
| Ex. 3 | 2.67 | 1.33 | 33 | 84.9 | 94.9 | 77.2 |
| Ex. 4 | 2.0 | 2.0 | 50 | 84.4 | 95.1 | 79.1 |
| Ex. 5 | 1.6 | 2.4 | 60 | 84.5 | 94.7 | 72.5 |
| Com-Ex. 2 | 0 | 4.0 | 100 | 81.4 | 88.5 | 56.1 |
| Ex. 6 | 2.0 | 2.0 | 50 | 85.1 | 93.8 | 73.8 |

Ex. = Example
Com-Ex. = Comparative Example
(In the table, the concentrations of PVDF and PES in positive electrode slurry represent the respective concentrations (mass %) relative to the total mass of the solid content in positive electrode slurry.)

Example 6

A secondary battery was prepared and evaluated in the same manner as in Example 4 except that Smika Excel 4100 P (product name, manufactured by Sumitomo Chemical Co., Ltd.) was used as a PES not containing a hydroxyl group at a terminal thereof. The results are shown in Table 1. A higher capacity retention ratio compared with the capacity retention ratios of Comparative Examples 1 to 2 was obtained. However, Example 4 where the PES having a hydroxyl group at a terminal thereof shows a higher capacity retention ratio, and therefore it has been found that the PES having a hydroxyl group at a terminal thereof is more preferable. The PES having a hydroxyl group at a terminal thereof used in Examples 1 to 5 contains 0.6 to 1.4 hydroxyl groups per 100 polymerized repeating units. Thus, it is considered that the effect of the hydroxyl group can be obtained when the content of the hydroxyl group is at least 0.6 or more per 100 polymerized repeating units.

Comparative Example 3

The same graphite powder and PVDF as used in Comparative Example 1 were arranged. A PVDF solution in which 8 mass % of PVDF was dissolved in NMP was prepared. The graphite powder and the PVDF solution were dispersed and kneaded so that the mass ratio of the solid content of the graphite powder to the solid content of PVDF became 95.0:5.0 to prepare negative electrode slurry while the viscosity was adjusted by appropriately adding NMP. The negative electrode slurry was applied on copper foil having a thickness of 15 μm, the copper foil being a negative electrode collector. Thereafter, a negative electrode active material layer was formed by conducting drying at 125° C. for 10 minutes to evaporate NMP. A negative electrode was prepared by pressing the negative electrode active material layer. In addition, the mass of the negative electrode active material layer per unit area after drying was set to 0.0083 g/cm². A secondary battery was prepared and evaluated in the same manner as in Comparative Example 1 other than the above-described conditions.

Comparative Example 4

The same graphite powder and PVDF solution as used in Comparative Example 3 and a PES solution in which 20 mass % of Sumika Excel 5003 PS (product name, manufactured by Sumitomo Chemical Co., Ltd.) as PES was dissolved in NMP were arranged. A secondary battery was prepared and evaluated in the same manner as in Comparative Example 3 except that negative electrode slurry was prepared by blending the graphite powder, the PVDF solution, and the PES solution so that the mass ratio of the solid content of the graphite powder, PVDF, and PES became 95:2.5:2.5.

The results of Comparative Example 3 and Comparative Example 4 are shown in Table 2. The capacity retention ratio in Comparative Example 4 where PVDF and PES were used together (PES concentration was 50%) for the negative electrode binders was remarkably lower than the capacity retention ratio in Comparative Example 3 where only PVDF was used for the negative electrode binder. The reason for this is not clear, but it may be possible that the negative electrode was deteriorated due to the reductive decomposition of PES at the negative electrode, or that PES was covered with the negative electrode active material to significantly lower the transfer of lithium ions or to inhibit the formation of the SEI film at the negative electrode. It was found from the result that the effect of PES in the present embodiment was effective only for the positive electrode.

Comparative Example 5

A secondary battery was prepared and evaluated in the same manner as in Comparative Example 1 except that LiCoO₂ (average particle diameter (D50): 11 μm, specific surface area: 0.5 m²/g) having a layered structure was used as a positive electrode active material. However, the mass of the positive electrode active material layer per unit area was set to 0.018 g/cm².

Comparative Example 6

A secondary battery was prepared and evaluated in the same manner as in Example 4 except that LiCoO₂ (average particle diameter (D50): 11 μm, specific surface area: 0.5 m²/g) having a layered structure was used as a positive electrode active material. However, the mass of the positive electrode active material layer per unit area was set to 0.018 g/cm².

The results of Comparative Examples 5 and 6 are shown in Table 2. In the case where the positive electrode active material was LiCoO₂, the effect of using PES was not recognized. It has been found from the fact that the present embodiment is particularly effective when the positive electrode active material contains lithium manganate having a spinel structure. It is inferred that the elution of Mn into the electrolyte solution is a major factor of degradation at elevated temperatures in the case of lithium manganate ($LiMn_2O_4$), whereas the elution of Co and its effect are small and therefore the coating effect of PES has not been obtained in the case of $LiCoO_2$.

Example 7

A secondary battery was prepared using a negative electrode (PVDF) prepared in the same manner as in Comparative Example 3 and a positive electrode prepared in the same manner as in Example 4 and evaluated. The results are shown in Table 2. Also in this case, a higher capacity retention ratio was obtained in Example 7 where PVDF and PES were used than the capacity retention ratio in Comparative Example 3 where only PVDF was used as a positive electrode binder. While the difference of the capacity retention ratios of Comparative Example 3 and Example 7 where the negative electrode binder is PVDF is 6 points, the difference of the capacity retention ratios of Comparative Example 1 and Example 4 where the negative electrode binder is SBR is 9.3 points, and it has been found that the effect of PES is larger when SBR is used as a negative electrode binder. The reason for this is not clear, but it is considered that deposition of the eluted Mn is different between the case where the negative electrode active material is covered with SBR and CMC and the case where it is covered with PVDF, thereby differentially affecting the deterioration of the negative electrode. From the result, it is more preferable that SBR is contained as a negative electrode binder and CMC or derivatives thereof is contained as a thickener when the graphite is contained as a negative electrode active material.

TABLE 2

|  | Negative electrode binder | Positive electrode binder | Charging and discharging efficiency (%) | Rate property (%) | Capacity retention ratio (%) |
|---|---|---|---|---|---|
| Com-Ex. 3 | PVDF | PVDF | 84.8 | 90.5 | 64.2 |
| Com-Ex. 4 | PVDF + PES(50%) | PVDF | 84.1 | 92.2 | 24.0 |
| Com-Ex. 5 | SBR | PVDF (positive electrode active material is $LiCoO_2$) | 84.9 | 94.5 | 72.3 |
| Com-Ex. 6 | SBR | PVDF + PES(50%) (positive electrode active material is $LiCoO_2$) | 84.5 | 92.5 | 71.5 |
| Ex. 7 | PVDF | PVDF + PES(50%) | 84.4 | 91.5 | 70.2 |

Com.-Ex. = Comparative Example
Ex. = Example

Figure 2:
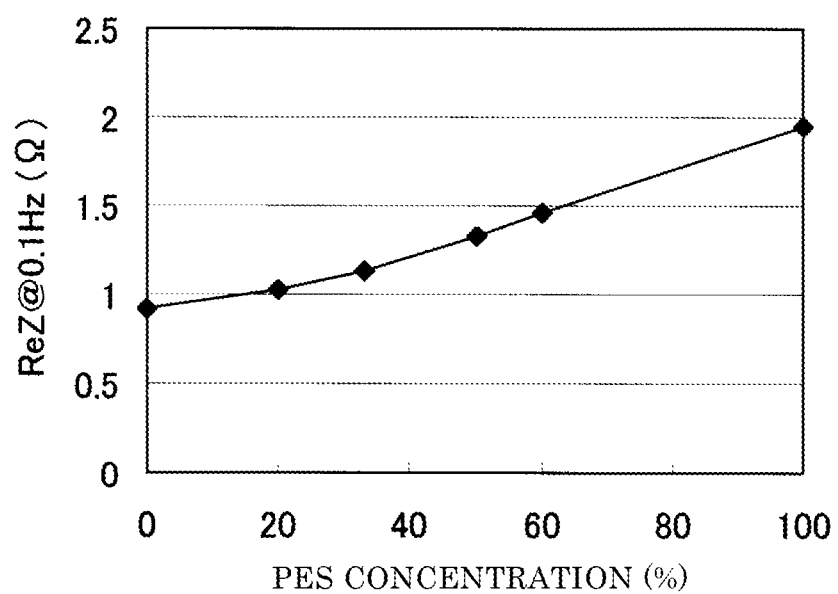
FIG. 2 is a diagram illustrating measured values of the AC impedance (values of the real part at 0.1 Hz) of a battery after the first charge prepared in the same manner as in Comparative Examples 1 and 2 and Examples 1 to 4 versus the PES concentration.

With regard to the battery that was prepared in the same manner as in Comparative Examples 1 to 2 and Examples 1 to 4, the AC impedance after the first charge was measured. The measurement was conducted in an open state (4.2 V) at room temperature under the conditions where the amplitude of an AC signal (peak to peak potential difference) was 10 mV and the frequency of AC was 0.1 Hz. The measured values of the real part of the impedance at 0.1 Hz versus the PES concentration are shown in FIG. 2. It was found that the impedance was increased in proportion to the PES concentration in the binder. It is considered that this is because the thickness of the coating layer of PES formed on the active material surface increases as the PES concentration is increased and it becomes difficult for lithium ions to be transferred. It is considered that one factor that the lowering of the initial properties and cycle properties were seen when the PES concentration was too high (>60 mass %) is caused by an increase in the battery resistance. From FIG. 2, it is preferable that the PES concentration in the positive electrode binder in the present embodiment is adjusted so as to become 1.6 times or less relative to the battery resistance in the case where only PVDF is used.

The invention claimed is:
1. A positive electrode for lithium ion secondary batteries, the positive electrode comprising a positive electrode active material and a positive electrode binder,
   wherein the positive electrode active material comprises lithium manganate having a spinel structure, and
   the positive electrode binder comprises at least polyvinylidene fluoride (PVDF) and a resin having sulfone linkages,
   wherein the resin having sulfone linkages is polyethersulfone (PES) having a hydroxyl group at a terminal thereof and a content of the resin having sulfone linkages is 33 mass % or more and 50 mass % or less in the positive electrode binder,
   and wherein the PES comprises 0.6 to 1.4 terminal hydroxyl groups per 100 polymerized repeating units.
2. A method for producing a positive electrode for lithium ion secondary batteries according to claim 1, comprising steps of coating and drying on a collector a positive electrode slurry comprising: a positive electrode active material comprising lithium manganate having a spinel structure; a conducting agent; and a binder comprising PVDF and PES.
3. A lithium ion secondary battery, comprising the positive electrode for lithium ion secondary batteries according to claim 1.
4. The lithium ion secondary battery according to claim 3, further comprising a negative electrode comprising: a negative electrode active material comprising graphite; a negative electrode binder comprising styrene butadiene rubber

(SBR); and a thickener comprising carboxymethyl cellulose (CMC) or a derivative thereof.

5. The positive electrode for lithium ion secondary batteries according to claim 1, further comprising a conductive assistant wherein a content of the conductive assistant is 2 to 8 mass % relative to the total mass of the positive electrode active material, the positive electrode binder and the conductive assistant.

6. The positive electrode for lithium ion secondary batteries according to claim 5, wherein the PES comprises 100 to 10,000 repeating units.

7. The positive electrode for lithium ion secondary batteries according to claim 6, wherein a content of the positive electrode binder is 2 to 8 mass % relative to the total mass of the positive electrode active material, the positive electrode binder and the conductive assistant.

8. The positive electrode for lithium ion secondary batteries according to claim 7, wherein a content of the positive electrode active material is 85 to 96 mass % relative to the total mass of the positive electrode active material, the positive electrode binder and the conductive assistant.

9. The positive electrode for lithium ion secondary batteries according to claim 8, wherein the lithium manganate having the spinel structure is represented by the following formula (1):

$$LiMn_{2-x}M_xO_4 \qquad (1)$$

(wherein M represents at least one element selected from the group consisting of Mg, Al, Co, Ni, Fe, and B, and $0 \leq x \leq 2$).

* * * * *

UNITED STATES PATENT AND TRADEMARK OFFICE
CERTIFICATE OF CORRECTION

PATENT NO. : 10,361,431 B2
APPLICATION NO. : 14/389430
DATED : July 23, 2019
INVENTOR(S) : Sasaki et al.

Page 1 of 1

It is certified that error appears in the above-identified patent and that said Letters Patent is hereby corrected as shown below:

In the Claims

Claim 9, Column 17, Line 30, "$0 \leq x2 \leq$." should read -- $0 \leq x2 <$. --.

Signed and Sealed this
Twenty-eighth Day of January, 2020

Andrei Iancu
*Director of the United States Patent and Trademark Office*